United States Patent [19]

Gimpel et al.

[11] Patent Number: 4,530,978
[45] Date of Patent: Jul. 23, 1985

[54] SURFACE COATING BINDER CONTAINING BLOCKED ISOCYANATE GROUPS

[75] Inventors: Juergen Gimpel, Ludwigshafen; Volker Schwendemann, Wiesenbach; Erich Gulbins, Heidelberg, all of Fed. Rep. of Germany

[73] Assignee: Basf Aktiengesellschaft, Fed. Rep. of Germany

[21] Appl. No.: 531,657

[22] Filed: Sep. 13, 1983

[30] Foreign Application Priority Data

Sep. 17, 1982 [DE] Fed. Rep. of Germany ....... 3234491

[51] Int. Cl.³ .................... C08F 283/00; C08G 59/14
[52] U.S. Cl. ..................................... 525/528; 525/531
[58] Field of Search ............................... 525/528, 531

[56] References Cited

U.S. PATENT DOCUMENTS

| 3,883,483 | 5/1975 | Anderson et al. | 528/45 |
| 3,976,615 | 8/1976 | Sekmakas | 204/181 C |
| 4,085,161 | 4/1978 | Sekmakas et al. | 525/529 |
| 4,399,256 | 8/1983 | Gimpel et al. | 525/528 |
| 4,436,878 | 3/1984 | Batzill et al. | 525/528 |

*Primary Examiner*—John C. Bleutge
*Assistant Examiner*—A. L. Carrillo
*Attorney, Agent, or Firm*—Keil & Weinkauf

[57] ABSTRACT

Surface coating binders which contain tertiary amino groups, blocked isocyanate groups, hydroxyl groups and ether groups and are water-soluble or water-dispersible as a result of partial or complete salt formation with an acid are prepared by copolymerization of a mixture comprising (A) an olefinically unsaturated compound which contains a tertiary amino group,
(B) an N-(1-alkenyl)-isocyanate which is blocked with a CH-, OH- or NH-acidic blocking agent and
(C) an adduct of an epoxy resin based on bisphenol A and epichlorohydrin, and an olefinically unsaturated carboxylic acid of 3 to 20 carbon atoms, a secondary amine and, if required, a saturated monocarboxylic acid of 1 to 20 carbon atoms, with or without one or more copolymerizable, olefinically unsaturated compounds not mentioned under (A), (B) and (C).

These surface coating binders are particularly useful as self-crosslinking or externally crosslinking binders for the cathodic electrocoating of metal articles.

8 Claims, No Drawings

SURFACE COATING BINDER CONTAINING BLOCKED ISOCYANATE GROUPS

The present invention relates to surface coating binders based on copolymers containing tertiary amino groups, blocked isocyanate groups, hydroxyl groups and ether groups.

It is known that binders based on acrylate resins which are crosslinked by isocyanates can be used for electrocoating. For example, U.S. Pat. No. 3,883,483 describes a cathodic polymer composition which contains the reaction product of a half-blocked diisocyanate with an ethylenically unsaturated hydroxy compound, such as hydroxyethyl acrylate. In such a compound, however, the isocyanate group required for the crosslinking is bonded to the carbon chain via an ester bond. Some of the ester bonds are cleaved by hydrolysis during aging of the electrocoating bath. As a result, the composition of the components required for the crosslinking is altered in the course of aging of the bath. This has an adverse effect on the chemical stability and the corrosion protection of the deposited surface coatings.

U.S. Pat. No. 3,976,615 relates to electrocoating binders based on polyethers which contain from 1.2 to 2 unsaturated ether groups per molecule and are copolymerized with unsaturated monomers possessing amino groups, eg. with dimethylaminoethyl methacrylate. The crosslinking agents mentioned are N-alkoxymethyl acrylamides, N-alkoxymethyl methacrylamides, phenoplasts and aminoplasts. However, these crosslinking agents make the electrocoating baths very voltage-sensitive. If these crosslinking agents are omitted, the resulting surface coatings no longer possess sufficient resistance to chemicals or satisfactory mechanical properties.

U.S. Pat. No. 4,085,161 describes electrocoating binders based on polyethers which contain from 1.2 to 2 unsaturated ether groups per molecule and are copolymerized with unsaturated monomers possessing amino groups. The copolymer contains, as a crosslinking agent, a blocked di- or polyisocyanate in which one NCO group has been reacted with an ethylenically unsaturated hydroxy compound, such as hydroxyethyl acrylate. This results in the abovementioned difficulties during aging of the bath.

European Pat. No. 39,425 discloses electrocoating binders based on polyethers whose terminal epoxide groups have been reacted with primary amines. The resulting products, which possess one or more secondary amino groups, are reacted with a compound possessing an epoxide group and a copolymerizable olefinic double bond, and are then copolymerized. The crosslinking agents used for the copolymers prepared by this very expensive preparative process are N-alkoxymethylacrylamides, N-alkoxymethylmethacrylamides, phenoplasts and aminoplasts, which lose their reactivity in the course of aging of the bath.

German Patent Application No. P3,133,770.8 describes electrocoating binders which contain blocked N-(1-alkenyl)-isocyanates and allyl/acryl-modified polyethers as comonomers. The pigment wetting, the corrosion protection and the wet film adhesion of these electrocoating finishes are said to be improved.

It is an object of the present invention to provide electrocoating binders which give coatings affording good corrosion protection and whose baths are sufficiently stable even in the pigmented state.

Moreover, the binders should exhibit good pigment wetting and wet film adhesion.

For the crosslinking reaction, these binders should contain a defined amount of blocked isocyanate groups which are bonded directly to the carbon chain of the polymer, and the polymer molecule may, if required, contain other reactive groups, so that the polymers can be used as self-crosslinking and externally crosslinking binders.

We have found that this object is very advantageously achieved by copolymers which, in addition to the blocked N-(1-alkenyl)-isocyanate, contain, as copolymerized units, modified epoxy resins based on bisphenol A, some of the epoxide groups being esterified with an olefinically unsaturated carboxylic acid and the remaining epoxide groups having been reacted with a secondary amine and, if appropriate, with an aliphatic monocarboxylic acid.

The present invention relates to a surface coating binder based on a copolymer which contains tertiary amino groups, blocked isocyanate groups, hydroxyl groups and ether groups, is water-soluble or water-dispersible as a result of partial or complete salt formation with an acid, and can be used as a self-crosslinking or externally crosslinking binder for the cathodic electrocoating of metal articles, wherein the copolymer contains, as copolymerized units, (A) from 6 to 22% by weight of one or more olefinically unsaturated compounds which contain a tertiary amino group, (B) from 10 to 35% by weight of an N-(1-alkenyl)-isocyanate which is blocked by means of a CH-, OH- or NH-acidic blocking agent, (C) from 30 to 60% by weight of an adduct obtained from
  (a) an epoxy resin based on bisphenol A and epichlorohydrin and having a molecular weight of from 300 to 3,500,
  (b) a polymerizable, olefinically unsaturated carboxylic acid of 3 to 20 carbon atoms and
  (c) a secondary amine, with or without
  (d) a saturated aliphatic monocarboxylic acid of 1 to 20 carbon atoms, and (D) from 0 to 54% by weight of one or more copolymerizable, olefinically unsaturated compounds not mentioned under (A), (B) or (C), with the proviso that the copolymer has a mean molecular weight of from 1,000 to 20,000 and the sum of the percentages stated under (A), (B), (C) and (D) is 100.

The present invention furthermore relates to the use of these surface coating binders as self-crosslinking binders or, in combination with a polyfunctional crosslinking agent, as externally crosslinking binders for the cathodic electrocoating of metal articles.

The electrocoating finish prepared from the novel surface coating binder contains in general from 5 to 20% by weight of the protonated copolymer according to the invention.

Regarding the components of the novel surface coating binder, the following may be stated specifically:

(A) Suitable components (A) are conventional ethylenically unsaturated compounds possessing a tertiary amino group, such as tertiary aminoacrylates or aminomethacrylates, eg. dialkylaminoalkyl acrylates or methacrylates where alkyl is of 1 to 8, preferably 1 to 4, carbon atoms, eg. N,N-dimethylaminoethyl methacrylate or N,N-diethylaminoethyl acrylate, or tertiary aminoacrylamides or aminomethacrylamides, eg. dialkylaminoalkylacrylamides or dialkylaminoalkylmethacrylamides where alkyl is of 1 to 8, preferably 1 to 4, carbon atoms, such as N,N-diethylaminopropylacrylamide, N,N-diethylaminopropylmethacrylamide, N,N-dimethylaminopropylacrylamide or N,N-dimethylaminopropylmethacrylamide.

The novel surface coating binder contains component (A) as copolymerized units in an amount of from 6 to 22, preferably 6 to 15, in particular from 8 to 13, % by weight, tertiary aminoacrylamides or aminomethacrylamides being particularly preferred.

(B) Component (B) is an adduct of an N-(1-alkenyl)-isocyanate with a CH-, OH- or NH-acidic blocking agent. Suitable N-(1-alkenyl)-isocyanates are those where alkyl is of 2 to 4 carbon atoms, preferably vinyl isocyanate and/or propylene isocyanate. Examples of suitable blocking agents for the preparation of component (B) are monophenols, such as phenol, cresol, trimethylphenol, primary alcohols, or secondary alcohols, such as isopropanol or cyclohexanol, tertiary alcohols, such as t-butanol and t-amyl alcohol, readily enolizable compounds, such as ethyl acetoacetate and acetylacetone, malonic acid derivatives, such as malonic diesters where the alcohol component is of 1 to 8 carbon atoms, malonodinitrile, secondary aromatic amines, such as N-methylaniline, N-methyltoluidine and N-phenyltoluidine, imides, such as succinimide and phthalimide, lactams, such as $\epsilon$-caprolactam, $\delta$-alerolactam and laurolactam, oximes, such as acetone oxime, butanone oxime and cyclohexanone oxime, and aromatic triazoles, such as triazabenzene. Particularly preferred blocking agents for the N-(1-alkenyl)-isocyanates are t-butanol, cyclohexanol, caprolactam and methyl ethyl ketoxime.

The blocked N-(1-alkenyl)-isocyanate, eg. the blocked vinyl isocyanate, can be prepared, for example, by a method similar to that described in Houben-Weyl, Methoden der organischen Chemie, volume 14/2 (1963), pages 61-70. The preparation is preferably carried out in the presence of a solvent. In the reaction of the N-(1-alkenyl)isocyanate, eg. vinyl isocyanate, with the blocking agent, about equimolar amounts are used. An excess of the isocyanate should be avoided since this may give rise to crosslinking at a later stage.

The novel copolymer contains component (B) as copolymerized units in an amount of from 10 to 35, preferably from 15 to 25, % by weight.

(C) Component (C) is a reaction product obtained from
(a) an epoxy resin based on bisphenol A and epichlorohydrin and having a molecular weight of from 300 to 3,500,
(b) a polymerizable, olefinically unsaturated carboxylic acid of 3 to 20 carbon atoms and
(c) a secondary amine, with or without
(d) a saturated aliphatic monocarboxylic acid of 1 to 20 carbon atoms.

Suitable epoxy resins (a) are in general those possessing 2 or more epoxide groups per molecule, for example those having an epoxide number of from 0.05 to 0.5.

Preferred epoxy resins are those which have a mean molecular weight of from 370 to 1,400, particularly preferably from 800 to 1,100.

Examples of suitable olefinically unsaturated carboxylic acids of 3 to 20 carbon atoms (b) are copolymerizable, $\alpha,\beta$-olefinically unsaturated monocarboxylic acids, such as acrylic acid, methacrylic acid and crotonic acid, as well as half-esters of $\alpha,\beta$-olefinically unsaturated dicarboxylic acids, such as those of maleic acid and of mesaconic acid, examples of suitable half-esters being those of alkanols of 1 to 20, preferably 3 to 8, carbon atoms.

Suitable secondary amines (c) are those of the general formula

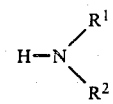

where $R^1$ and $R^2$ are identical or different and are each $C_nH_{2n+1}$ where n is 1 to 10, $C_nH_{2n}OH$ where n is 1 to 10, preferably 2 to 4, cycloaliphatic radicals $C_nH_{2n-1}$ where n is 4 to 8, preferably 5 to 7, aromatic radicals, such as phenyl radicals, and araliphatic radicals, such as benzyl radicals, or $R^1$ and $R^2$ can be bonded together to form a ring. Secondary alkanolamines are preferred, methylethanolamine and diethanolamine being particularly preferred.

(d) Examples of suitable saturated aliphatic monocarboxylic acids of 1 to 20 carbon atoms, which may or may not be present, are formic acid, acetic acid, propionic acid or butyric acid, valeric acid, etc. Formic acid and acetic acid are preferred.

In the epoxy resin based on bisphenol A and epichlorohydrin, in general from 10 to 50, preferably from 40 to 50, mole % of the epoxide groups are esterified with a polymerizable, olefinically unsaturated monocarboxylic acid, from 10 to 50, preferably from 10 to 40, mole % of the epoxide groups have been reacted with a secondary amine, and as much as 80, preferably from 10 to 50, mole % of the epoxide groups are esterified with an aliphatic monocarboxylic acid.

The reaction product of an epoxy resin having a mean molecular weight of about 900 with from 40 to 50 mole % of acrylic acid or methacrylic acid, from 20 to 50 mole % of diethanolamine or methylethanolamine and from 0 to 40 mole % of acetic acid or formic acid is particularly preferred.

The novel copolymer contains component (C) as copolymerized units in an amount of from 30 to 60, preferably from 35 to 50, % by weight.

(D) Suitable components (D) are other copolymerizable, olefinically unsaturated compounds not mentioned under (A), (B) and (C), such as esters of acrylic or methacrylic acid with a monoalcohol of 1 to 18, preferably 1 to 8, carbon atoms, eg. methyl acrylate, ethyl acrylate, butyl acrylate, 2-ethylhexyl acrylate and methyl methacrylate. Any other copolymerizable unsaturated compound is also suitable, in particular vinyl esters of carboxylic acids of 2 to 10 carbon atoms, eg. vinyl acetate, vinyl propionate and vinyl pivalate, vinyl-aromatics, eg. styrene, acrylonitrile and olefinically unsaturated triglycerides, such as isomerized linseed oil, as well as mixtures of these monomers.

The novel copolymer contains component (D) as copolymerized units in an amount of from 0 to 54, preferably from 10 to 44, % by weight.

The novel copolymers are advantageously prepared in a hydroxyl-free solvent, such as an ether, eg. tetrahydrofuran, an ester, eg. ethyl acetate or n-butyl acetate, or an aromatic, eg. toluene, in the presence of a freeradical iniator, such as an azobiscarboxamide, an azobiscarboxylic acid nitrile or a peroxide, in general at from 50° to 120° C., preferably from 60° to 90° C., in the presence or absence of a regulator, such as mercaptoethanol, t-dodecylmercaptan or diisopropylxanthogen disulfide.

Examples of particularly preferred surface coating binders are copolymers comprising from 8 to 13% by weight of N,N-dimethylaminopropyl acrylamide or N,N-dimethylaminopropyl methacrylamide, from 15 to 25% by weight of vinyl isocyanate blocked with caprolactam or methyl ethyl ketoxime, from 35 to 50% by weight of a reaction product of an epoxy resin based on bisphenol A and epichlorohydrin and having a mean molecular weight of 900 with a mixture of acrylic acid, diethanolamine and acetic acid, and from 12 to 42% by weight of 2-ethylhexyl acrylate.

The novel copolymers are non-crosslinked products having a mean molecular weight of from 1,000 to 20,000, preferably from 2,000 to 10,000 (measured using a vaporpressure osmometer). The K values (determined by the Fikentscher method; 3% strength in glacial acetic acid) are accordingly about 15–35, preferably 18–24.

After they have been prepared, the copolymers may furthermore be quaternized. To do this, the copolymers, in the presence of an acid, are reacted with an epoxide, such as ethylene oxide, propylene oxide or butylene oxide, or a glycide, or are treated with an alkylating agent, eg. methyl iodide or dimethylsulfoxide.

The novel copolymers contain tertiary amino groups, quaternary or non-quaternary ammonium groups, blocked isocyanate groups, ether groups and hydroxyl groups.

The novel copolymers are generally used as surface coating binders, and become water-soluble or waterdispersible as a result of partial or complete salt formation with an acid.

For this purpose, the copolymers are partially or completely neutralized with an acid. Suitable neutralizing agents are organic and inorganic acids, acetic acid, lactic acid and gluconic acid being preferred. Where the novel surface coating binders are used in an aqueous medium, the degree of neutralization should be from 10 to 120%.

Where the novel binder is used, the surface coating can contain polyfunctional crosslinking agents, such as hydroxyl-containing polymers, polyesters or polyadducts, for example aminoplasts or phenol/formaldehyde resins, as well as pigments, eg. titanium dioxide, talc or carbon black, in amounts of from 10 to 80, preferably from 20 to 65, % by weight, based on the binder, the particular amounts used depending on the intended use. Furthermore, inorganic and organic colored pigments can likewise be present in amounts of not more than 5% by weight, leveling agents can be present in an amount of not more than 10% by weight, waxes for increasing the scratch-resistance can be present in an amount of not more than 10% by weight and catalysts for the reaction in which the blocking agent is removed, eg. dibutyl-tin dilaurate, can be present in an amount of not more than 2% by weight, the percentages being based on the binder in each case.

The novel surface-coating binders are particularly useful for cathodic electrocoating, and can be used either as self-crosslinking binders or as externally crosslinking binders.

The electrocoating finishes according to the invention are particularly useful for coating metallic articles, for example those made of iron, steel or aluminum.

The cationic electrocoating baths are prepared in a conventional manner, for example as described in W. Machu, Elektrotauchlackierung (1974), pages 155 et seq. The solids content of the electrocoating baths is in general from 5 to 25% by weight, and the pH is from 4.0 to 7.5.

The coatings obtained using the novel binder are very hard, very flexible and resistant to chemicals, afford good corrosion protection, adhere well as wet films and permit good wetting of the pigments. These good properties of the surface coatings are not adversely affected by the aging of the bath. In particular, the novel surface coating binders have very good bath stability, even in the pigmented state.

In the Examples which follow, parts and percentages are by weight, unless stated otherwise.

Preparation of component (B)

(B1) Tert.-butyl N-vinylcarbamate 69 parts of vinyl isocyanate and 70 parts of ethyl acetate are initially taken in a reaction vessel equipped with a high-efficiency condenser (with cooling brine), a stirrer, a thermometer and a feed Vessel. 74 parts of tert.-butanol, 73 parts of ethyl acetate and 0.01% of dibutyl-tin dilaurate are added in the course of 1 hour at 40° C., after which the mixture is allowed to react for a further 10 hours at this temperature. A pale yellow clear solution is formed. Content of blocked isocyanate groups: 14.7%.

(B2) Cyclohexyl N-vinylcarbamate 69 parts of vinyl isocyanate and 89.5 parts of ethyl acetate are initially taken in a reaction vessel and are heated at 40° C. A mixture of 110 parts of cyclohexanol, 89.5 parts of ethyl acetate and 0.02% of dibutyltin dilaurate as the catalyst is added in the course of one hour, after which the mixture is allowed to continue reacting for a further 2 hours at 40° C. A pale yellow solution is obtained, from which, on cooling, the reaction product separates out in the form of crystals. Content of blocked isocyanate groups: 11.7%.

(B3) N-(N'-Vinylcarbamyl)-caprolactam 113 parts of ε-caprolactam, 91 parts of ethyl acetate and 0.015% of dibutyl-tin dilaurate are initially taken in a reaction vessel and are heated at about 50° C. A mixture of 69 parts of vinyl isocyanate and 91 parts of ethyl acetate is added dropwise in the course of 1 hour, after which the mixture is allowed to continue reacting for a further 5 hours. A pale yellow clear solution is obtained. Content of blocked isocyanate groups: 11.5%. Preparation of component (C)

(C1) (for comparative polymer)

150 parts of allyl alcohol, 124.1 parts of acrylic acid, 1.25 parts of boron trifluoride diethyl-etherate solution and 2.42 parts of hydroquinone are heated under nitrogen at 90° C. Feed 1, consisting of 2,154.75 parts of an epoxy resin based on bisphenol A and epichlorohydrin and having a mean molecular weight of 900 and an epoxide number of 0.21, eg. ®Epikote 1001, and 718.25 parts of methyl ethyl ketone, and feed 2, consisting of 1.25 parts of boron trifluoride diethyl-etherate solution and 100 parts of methyl ethyl ketone, are metered in simultaneously in the course of 2.5 hours at 90° C. The mixture is kept at 90° C. for a further hour, after which it is cooled.

The resulting clear yellowish solution has an epoxide number of 0.00 and a solids content of 73.4%.

(C2) 52.57 parts of diethanolamine are added uniformly to 475 parts of the epoxy resin mentioned under (C1) and 317 parts of methyl ethyl ketone at 60° C. in the course of one hour. The mixture is allowed to react for 2 hours at 60° C., after which 36 parts of acrylic acid and 0.56 part of hydroquinone are added uniformly in the course of one hour. The mixture is stirred for 3 hours at 60° C., and a clear yellowish solution having an epoxide number 0.00 and a solids content of 63.2% is obtained.

(C3) 21 parts of diethanolamine are added uniformly to 475 parts of the epoxy resin mentioned under (C1) and 317 parts of methyl ethyl ketone at 60° C. in the course of one hour. The mixture is allowed to react for one hour at 60° C., after which 24 parts of acetic acid, 28.8 parts of acrylic acid and 0.56 part of hydroquinone are added uniformly in the course of 1 hour. The mixture is stirred at 70° C. until the epoxide number reaches 0.00. The resulting clear solution has a solids content of 60.5%. Preparation of the copolymer solutions Polymer 1 (comparative polymer)

30% of a feed consisting of 400 parts of the adduct (B3), 817 parts of component (C1), 60 parts of dimethylaminopropyl methacrylamide, 140 parts of 2-ethylhexyl acrylate, 5 parts of t-dodecylmercaptan, 20 parts of azobisisobutyronitrile and 249 parts of ethyl acetate is initially taken in a reaction vessel equipped with a stirrer, a reflux condenser and an internal thermometer. This mixture is heated to 80° C. under nitrogen, and the remaining feed is added in the course of 3 hours at this temperature. Thereafter, polymerization is continued for one hour, 5 parts of azobisisobutyronitrile are added and polymerization is continued for a further hour at 80° C. The resulting clear solution contains a resin with a K value of 22.4 and has a solids content of 59.8%.

Polymer 2 (comparative polymer)

The polymer is prepared as described in U.S. Pat. No. 4,085,161, Example 5. An adduct obtained from 2-hydroxyethyl acrylate, toluylene diisocyanate and 2-ethylhexanol as described in U.S. Pat. No. 3,883,483 is used as the blocked isocyanate component. The resulting solution contains a resin with a K value of 19.2 and has a solids content of 56.0%.

Polymer 3 (according to the invention)

As described in the case of polymer 1, a polymer solution is prepared from 800 parts of the adduct (B3), 1,615 parts of component (C2), 180 parts of dimethylaminopropyl methacrylamide, 420 parts of 2-ethylhexyl acrylate, 80 parts of mercaptoethanol, 40 parts of azobisisobutyronitrile and 60 parts of toluene. After the polymerization, the mixture is diluted with 262 parts of isodecanol. The resulting clear solution contains a resin with a K value of 20.7 and has a solids content of 60.8%.

Polymer 4 (according to the invention)

As described in the case of polymer 1, a polymer solution is prepared from 400 parts of the adduct (B3), 831 parts of component (C3), 90 parts of dimethylaminopropyl methacrylamide, 210 parts of 2-ethylhexyl acrylate, 35 parts of mercaptoethanol, 20 parts of azobisisobutyronitrile and 4 parts of toluene. After the polymerization, the mixture is diluted with 131 parts of isodecanol. The resulting clear solution contains a resin with a K value of 21.3 and has a solids content of 59.8%.

Polymer 5 (according to the invention)

As described in the case of polymer 1, a polymer solution is prepared from 400 parts of the adduct (B3), 497 parts of component (C3), 90 parts of dimethylaminopropyl methacrylamide, 410 parts of 2-ethylhexyl acrylate, 35 parts of mercaptoethanol, 20 parts of azobisisobutyronitrile and 139 parts of toluene. After the polymerization, the mixture is diluted with 131 parts of isodecanol. The resulting clear solution contains a resin with a K value of 19.2 and has a solids content of 59.5%.

COMPARATIVE EXAMPLES

Electrocoating finish 1

125 parts of the 59.8% strength solution of polymer 1, 45 parts of titanium dioxide, eg. Tioxide RTC 90, 1.3 parts of acetic acid and 823 parts of water are worked in a ball mill to give a dispersion having a solids content of 12% by weight.

Electrocoating finish 2

139.5 parts of the 56.0% strength solution of polymer 2, 45 parts of titanium dioxide, 2.7 parts of acetic acid and 810 parts of water are worked in a ball mill to give a dispersion having a solids content of 12% by weight. Electrocoating finishes according to the invention Electrocoating finish 3

123 parts of the 60.8% strength solution of polymer 3, 45 parts of titanium dioxide, 1.16 parts of acetic acid and 831 parts of water are worked in a ball mill to give a dispersion having a solids content of 12% by weight.

Electrocoating finish 4

125 parts of the 59.8% strength solution of polymer 4, 45 parts of titanium dioxide, 0.89 part of acetic acid and 829 parts of water are worked in a ball mill to give a dispersion having a solids content of 12% by weight.

Electrocoating finish 5

126 parts of the 59.5% strength solution of polymer 5, 45 parts of titanium dioxide, 0.87 part of acetic acid and 828 parts of water are worked in a ball mill to give a dispersion having a solids content of 12% by weight.

Zinc-phosphatized steel sheets are coated with these electrocoating finishes for 2 minutes, and the sheets are then baked for 30 minutes at 190° C. The properties of the electrocoating finishes and of the steel sheets cataphoretically coated with these finishes are shown in the Table below.

| Electrocoating finish No. | Comparative Examples | | Electrocoating finishes according to the invention | | |
|---|---|---|---|---|---|
| | 1 | 2 | 3 | 4 | 5 |
| Pigment wetting | not satisfactory | poor | good | good | good |
| pH | 5.2 | 6.2 | 6.2 | 5.2 | 6.2 |
| Deposition voltage [V] | 35 | 40 | 105 | 120 | 150 |
| Layer thickness [μm] | 16 | 11 | 22 | 21 | 22 |
| Erichsen deep-drawing value [mm] (DIN 53,156) | 5.5 | 5.4 | 6.0 | 5.7 | 6.9 |
| Corrosion protection [hours/mm] (SS DIN 50,021) | 240/10 | 168/6 | 760/5.0 | 480/6.0 | 240/4.5 |
| Wet film adhesion | poor | poor | good | good | good |

We claim:

1. A surface coating binder based on a copolymer which contains tertiary amino groups, blocked isocyanate groups, hydroxyl groups and ether groups, is water-soluble or water-dispersible as a result of partial or complete salt formation with an acid, and can be used as a self-crosslinking or externally crosslinking binder for the cathodic electrocoating of metal articles, wherein the copolymer contains, as copolymerized units,
- (A) from 6 to 22% by weight of one or more olefinically unsaturated compounds which contain a tertiary amino group,
- (B) from 10 to 35% by weight of an N-(1-alkenyl)isocyanate which is blocked by means of a CH-, OH- or NH-acidic blocking agent,
- (C) from 30 to 60% by weight of an adduct obtained from
  - (a) an epoxy resin based on bisphenol A and epichlorohydrin and having a molecular weight of from 300 to 3,500,
  - (b) a polymerizable, olefinically unsaturated carboxylic acid of 3 to 20 carbon atoms and
  - (c) a secondary amine, with or without
  - (d) a saturated aliphatic monocarboxylic acid of 1 to 20 carbon atoms, with the proviso that from 10 to 50 mole % of the epoxide groups of the component (a) are esterified with the polymerizable, olefinically unsaturated monocarboxylic acid (b), from 10 to 50 mole % of the expoxide groups of the component (a) have been reacted with the secondary amine (c), and up to 80 mole % of the expoxide groups of the component (a) are esterified with the aliphatic monocarboxylic acid (d), and
- (D) from 0 to 54% by weight of one or more copolymerizable, olefinically unsaturated compounds not mentioned under (A), (B) or (C), with the proviso that the copolymer has a mean molecular weight of from 1,000 to 20,000 and the sum of percentages stated under (A), (B), (C), and (D) is 100.

2. A surface coating binder as claimed in claim 1, wherein an adduct of vinyl isocyanate or propenyl isocyanate with cyclohexanol, t-butanol, ε-caprolactam or methyl ethyl ketoxime, in which the molar ratio of isocyanate to blocking agent is 1:1, is used as component (B).

3. A surface coating binder as claimed in claim 1, wherein the ratio of the number of equivalents of reactive hydrogen atoms of component (C) to the number of equivalents of blocked isocyanate groups of component (B) is about 1:1.

4. A surface coating binder as claimed in claim 2, wherein the ratio of the number of equivalents of reactive hydrogen atoms of component (C) to the number of equivalents of blocked isocyanate groups of component (B) is about 1:1.

5. A surface coating binder as claimed in claim 1, wherein component (C) is an adduct of (a) an epoxy resin based on bisphenol A and epichlorohydrin and having a molecular weight of from 300 to 3,500, (b) acrylic acid or methacrylic acid, (c) diethanolamine or methylethanolamine and (d) acetic acid or formic acid.

6. A surface coating binder as claimed in claim 2, wherein component (C) is an adduct of (a) an epoxy resin based on bisphenol A and epichlorohydrin and having a molecular weight of from 300 to 6 3,500, (b) acrylic acid or methacrylic acid, (c) diethanolamine or methylethanolamine and (d) acetic acid or formic acid.

7. A surface coating binder as claimed in claim 3, wherein component (C) is an adduct of (a) an epoxy resin based on bisphenol A and epichlorohydrin and having a molecular weight of from 300 to 3,500, (b) acrylic acid or methacrylic acid, (c) diethanolamine or methylethanol-amine and (d) acetic acid or formic acid.

8. A surface coating binder as defined in claim 1, wherein the copolymer is prepared in a hydroxyl-free solvent, in the presence of a free-radical initiator and at a temperature of from 50° to 120° C.

* * * * *

UNITED STATES PATENT AND TRADEMARK OFFICE
CERTIFICATE OF CORRECTION

PATENT NO. : 4,530,978
DATED : July 23, 1985
INVENTOR(S) : Gimpel et al.

It is certified that error appears in the above-identified patent and that said Letters Patent is hereby corrected as shown below:

Claim 6, column 10, line 24, delete "6".

Signed and Sealed this

Eighth Day of October 1985

[SEAL]

Attest:

Attesting Officer

DONALD J. QUIGG

Commissioner of Patents and Trademarks—Designate